United States Patent
Weiss et al.

(10) Patent No.: US 6,369,939 B1
(45) Date of Patent: Apr. 9, 2002

(54) ILLUMINATION DEVICE FOR A MICROSCOPE INCLUDING TWO LIGHT SOURCES

(75) Inventors: Albrecht Weiss, Linden; Michael Ganser; Helmut Rühl, both of Giessen; Manfred Gilbert, Solms, all of (DE)

(73) Assignee: Leica Microsystems Wetzlar GmbH, Wetzlar (DE)

(*) Notice: Subject to any disclaimer, the term of this patent is extended or adjusted under 35 U.S.C. 154(b) by 0 days.

(21) Appl. No.: 09/555,844
(22) PCT Filed: Oct. 2, 1999
(86) PCT No.: PCT/DE99/03184
§ 371 Date: Jun. 5, 2000
§ 102(e) Date: Jun. 5, 2000
(87) PCT Pub. No.: WO00/20911
PCT Pub. Date: Apr. 13, 2000

(30) Foreign Application Priority Data

Oct. 5, 1998 (DE) .......................................... 198 45 603

(51) Int. Cl.[7] .............................................. G02B 21/12
(52) U.S. Cl. ....................................... 359/387; 359/388
(58) Field of Search ................................ 359/385, 387, 359/388, 389

(56) References Cited

U.S. PATENT DOCUMENTS

| | | | |
|---|---|---|---|
| 4,561,731 A | 12/1985 | Kley | 350/510 |
| 4,806,776 A | 2/1989 | Kley | 250/560 |
| 4,852,985 A | 8/1989 | Fujihara | 350/523 |
| 5,566,019 A | 10/1996 | Stankewitz | 359/389 |

FOREIGN PATENT DOCUMENTS

| | | |
|---|---|---|
| DE | 1 056 851 | 10/1954 |
| DE | 31 08 389 | 4/1982 |
| DE | 37 34 691 | 4/1988 |
| DE | 37 08 647 | 7/1993 |
| DE | 42 31 406 | 3/1994 |
| DE | 196 44 662 | 4/1998 |
| GB | 2 232 270 | 12/1990 |
| WO | WO 94/07166 | 3/1994 |

OTHER PUBLICATIONS

Patent Abstracts of Japan, vol. 1998, No. 10, Aug. 31, 1998.

*Primary Examiner*—Jon Henry
(74) *Attorney, Agent, or Firm*—Foley & Lardner

(57) ABSTRACT

An illumination system (1) for a microscope, in which a first light source (2), a collector lens (3), an aperture diaphragm (4), and a condenser lens ((5) are arranged in the illumination beam path (6), is described. The illumination light is directed through the aperture diaphragm (4) via the condenser lens (5) into the object plane (9). Arranged in the illumination beam path (6) on the optical axis (20) is a second light source (8) that is imaged at infinity by the condenser lens (5).

15 Claims, 1 Drawing Sheet

ILLUMINATION DEVICE FOR A MICROSCOPE INCLUDING TWO LIGHT SOURCES

The invention concerns an illumination system for a microscope as defined in the preamble of claim 1.

The illumination system for a microscope contains, in the illumination beam path, a light source, a collector lens, an adjustable aperture diaphragm, and a condenser lens. When objectives with different degrees of magnification are used, a Köhler illumination system must cover a wide range of apertures and fields. In the case of a microscope, the illumination system must ensure that both a 100×/0.90 objective with a large aperture and a small object field, and a 4×/0.10 objective with a small aperture and large object field, can be used.

Known illumination systems make available an excess of light, only a small portion of which is used. The light sources used for illumination systems of this kind are high-output halogen lamps with a large lamp filament, which generate a large geometric light flux. The geometric light flux results from the large illumination surface and the wide emission angle (beam angle) of the halogen lamp.

Only a portion of the large geometric light flux can be used by the various objectives, however. What is used is either a large object field (a large illuminated area) with a small aperture (narrow beam angle), or a small object field (a small illuminated area) with a large aperture (wide beam angle).

The use of high-output halogen lamps of course also causes thermal problems in the microscope stand. The stand expands because of the heating. In addition to the undesired thermal radiation, this can also cause a preset focus to be lost because of the expansion.

WO 94 07 166 A1 discloses. an illumination system for a microscope in which an optimized geometric light flux is ensured by the use of replaceable condenser heads and condenser lenses. Selectable installation of the optical subassemblies makes it possible to illuminate both small fields with large apertures and large fields with small apertures. This illumination system has proven successful. The replaceable optical subassemblies associated with this illumination system require a high level of manufacturing complexity, however. In addition, the condenser lens must also be replaced whenever an objective is changed.

DE 196 44 662 discloses an illumination system for a microscope in which no optical components are moved. A light source that shines through a planar LCD is provided for illumination. A selectable transparent/opaque pattern is generated on the LCD by way of a control system. By changing the size of the pattern, the illumination can be adapted to different apertures. With this device, different illumination conditions are established under software control. Here again, however, it is necessary for the light source to make available a large geometric light flux, only a small portion of which is used.

DE 31 08 389 A1 discloses an illumination system for a microscope in which a controllable liquid crystal cell having a defined structure is used as a mechanical stop. Differently configured liquid crystal cells are used for each of the various types of illumination, for example incident/transmitted light illumination, oblique illumination, darkfield illumination, phase-contrast illumination, and polarized illumination.

Because of the permanently defined electrode structures of the respective cells, they can be used only for defined magnification conditions in the microscope. If the magnification is changed by using a different microscope objective, a different liquid crystal cell adapted thereto must be installed in the microscope. This is, of course, also the case whenever a different type of microscope illumination is selected.

DE 37 34 691 C2 discloses an illumination apparatus for a microscope in which a plurality of LEDs, combined into a two-dimensional matrix, are provided as the light source. This compartmentalized LED matrix contains a plurality of individual LEDs, in the colors red, green, and blue (RGB), arranged next to one another. By way of a corresponding control system, individual LEDs can be activated and a corresponding illumination pattern can thus be generated. It is of course very complex and expensive to provide and control so many LEDs.

DE 42 31 406 A1 discloses a bright-field transmitted-light illumination system for microscopes in which a transparent disk having a centrally arranged screen pattern is provided in the illumination beam path. With this illumination system, uniform illumination of the field diaphragm is achieved because the screen pattern creates multiple images, arranged next to one another, of the lamp filament of the light source.

DE 37 08 647 C2 describes a Köhler illumination arrangement for microscopes having a collector lens, an aperture diaphragm, and a condenser lens. With this illumination system, uniform illumination of the object plane is achieved by the fact that a diffusing element is arranged between the collector lens and a reflector adjacent to the light source. The. collector lens projects an image of the light source at infinity.

It is generally true of all light sources of planar configuration, that the light source makes available a high geometric light flux, only a small portion of which is used.

It is therefore the object of the present invention to minimize the thermal load on the microscope and the specimen.

This object is achieved, according to the present invention, by the features recited in the characterizing portion of claim 1. Further advantageous developments are the subject matter of the dependent claims.

The combined arrangement of the two light sources in the illumination beam path results in an illumination that, with a fixed condenser, achieves an optimized geometric light flux for high-magnification objectives with a large aperture and small object field, and for low-magnification objectives with a small aperture and large object field.

Arranging the second light source in a central bore of the collector lens makes available a simple mount for the light source.

In an embodiment of the invention, diffusing components in the form of a diffusion disk and/or a frosted lens surface can be provided in the illumination beam path.

LEDs are advantageously used as the light source. Other point light sources, such as small halogen lamps or incandescent lamps, can of course also be used. The LEDs have the advantage of creating almost no heat when operating, and of emitting the light in directed fashion. When white-light LEDs are used, their brightness can also be regulated, without a color shift, by way of a simple change in current. With the use of RGB LEDs,. which also generate white light and can be dimmed by changing the current, it is moreover possible to control the intensity of each individual color separately.

The illumination system having the two light sources is preferably arranged in a separate housing and is configured as a retrofittable component for existing microscope condenser heads. The illumination system can of course also be permanently joined to the condenser lens, thus forming a single component.

In a further embodiment of the invention, an electrical control system is provided with which the two light sources can be switched separately or together. The brightness and/or color temperature of the light sources can thereby be correspondingly regulated. The control system furthermore has a voltage supply for the light sources in the form of a battery or rechargeable battery and/or a DC line power supply.

In a further embodiment of the invention, provision is made for the RGB LEDs to be activated sequentially in order to generate an RGB television signal. A black-and-white video camera or a corresponding chip can be used in this context as the light-sensitive receiver module. Provision is also made for the LEDs to be activated in pulsed mode to generate flashed illumination.

The invention will be explained in further detail with reference to an exemplary embodiment, with the aid of the schematic drawings in which.

Figure 1:
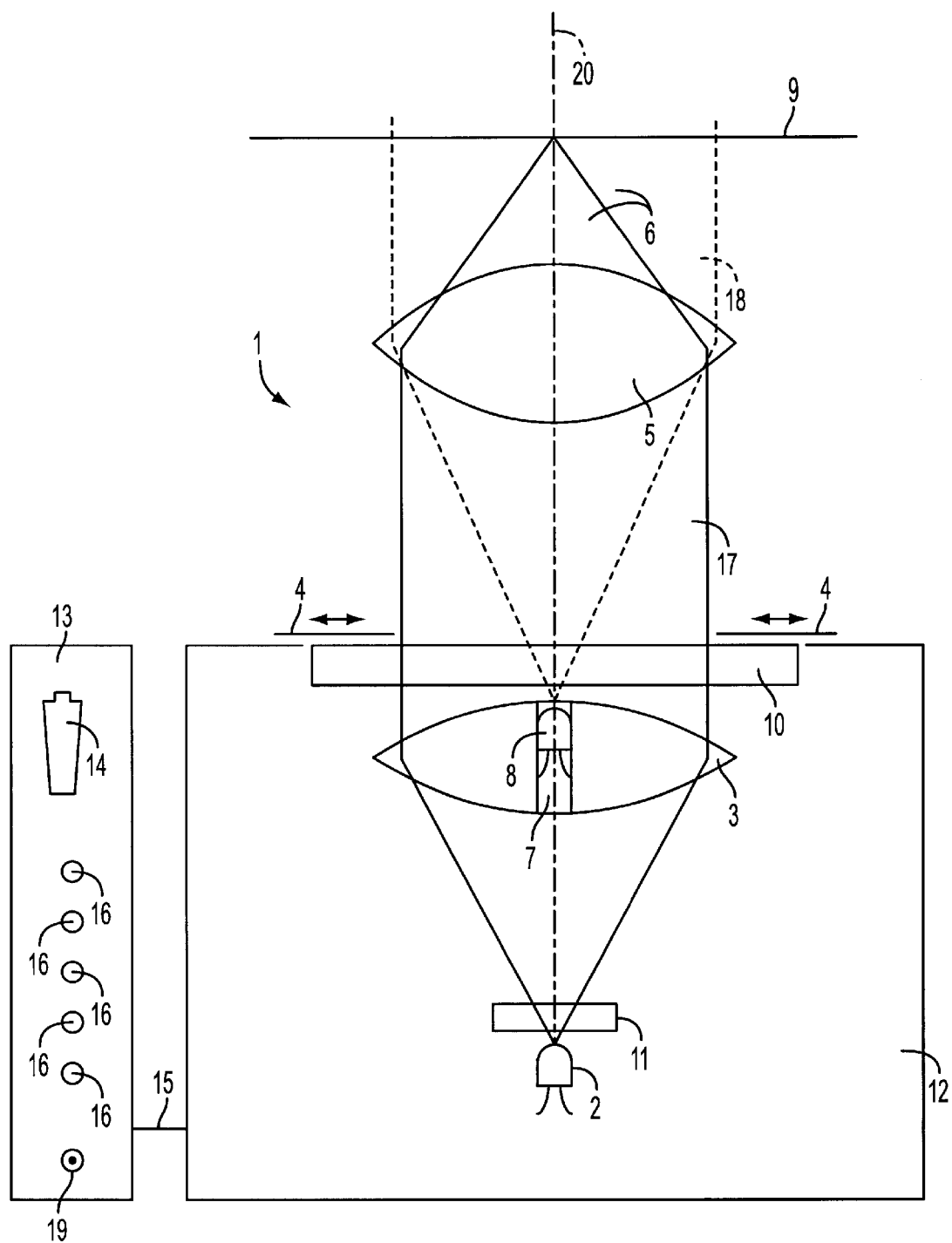
FIG. 1 shows a schematic depiction of the illumination beam path.

FIG. 1 shows an illumination beam path 1 for a microscope having a first light source 2, an second diffusion disk 11 in front, and a collector lens 3. Collector lens 3 has a central bore 7 in which a second light source 8 is arranged. Arranged after second light source 8 in illumination beam path 1 is a first diffusion disk 10. The aforesaid components are arranged in a separate housing 12, and first diffusion disk 10 seals housing 12 in dust-tight fashion.

An adjustable aperture diaphragm 4, a condenser lens 5, and an object plane 9 are provided farther along in illumination beam path 1. Condenser lens 5 and aperture diaphragm 4 can be arranged together in a further housing (not depicted here).

First light source 2 is arranged at the focal point of collector lens 3, which generates a parallel illumination beam 17. This parallel beam 17 is passed through first diffusion disk 10.

The illumination rays diverge at small angles through diffusion disk 10. The rays are then deflected by condenser lens 5 into object plane 9. This illumination corresponds to a critical illumination, and is used for an objective having a small field and large aperture.

Second light source 8 arranged in bore 7 of collector lens 3 emits directly through diffusion disk 10, at a large angle, into condenser lens 5. From this condenser lens, light source 8 is imaged at infinity and thus forms a parallel illumination beam 18. Köhler illumination is thus produced with second light source 8. This light source 8 is used for the illumination of objectives having a wide field and small aperture.

Because the two light sources 2 and 8 are provided, only the geometric light flux that is being used by the corresponding objective is generated. It is thus also possible to dispense with the high-output halogen lamps hitherto used.

It is of course possible to arrange light source 8 directly above collector lens 3 on optical axis 20, or even in a blind hole (not depicted) in first diffusion disk 10. All that is necessary is to ensure that light source 8 is arranged as close as possible to the aperture diaphragm plane or to a plane conjugate therewith.

The arrangement of light source 8 in central bore 7 of collector lens 3, or in the blind hole (not depicted) in first diffusion disk 10, ensures reliable centering and mounting of light source 8 on optical axis 20.

A control system 13, which is connected via electrical wiring 15 to housing 12 and to the two light sources 2, 8, is provided in order to control the two light sources 2 and 8. Control system 13 has a battery 14 as the voltage source for regulating and operating light sources 2, 8, and a terminal 19 for a line power supply. It is self-evident that this battery can also be embodied as a rechargeable battery that can be operated whenever a line voltage source is not present.

The control system moreover has a plurality of control knobs 16 with which the two light sources 2, 8 can be switched selectably or together. Provision is also made for regulating the respective lamp brightness by way of control knobs 16. When LEDs are used, the brightness can be set by simply regulating the current, without causing any change in the color temperature of the illumination light.

In a further embodiment of the invention, RGB LEDs, in which the individual colors are each separately controlled, are provided as light sources 2 and 8. In this fashion, a specific color temperature or monochromatic light can easily be established. Provision can also be made for first light source 2 to be operated as a low-output halogen lamp, and for light source 8 to be an LED.

The arrangement of light sources 2, 8 together with collector lens 3 in a separate housing 12 has the advantage that this illumination system can be attached to existing condenser heads as a retrofittable component.

Figure 2:
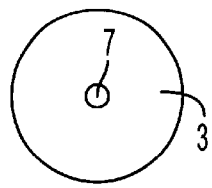
FIG. 2 shows the collector lens with the central bore.

FIG. 2 shows collector lens 3 with central bore 7. The surface of collector lens 3 can be of diffusing configuration as a result of frosting or a corresponding screen pattern. The result in this case is that first diffusion disk 10 (FIG. 1) in the illumination beam path can be omitted.

It is of course within the context of the invention if the collector lens is configured as a simple illumination lens and/or if the condenser lens is configured as a multiple-lens condenser head.

Parts list

1 Illumination system
2 First light source
3 Collector lens
4 Aperture diaphragm
5 Condenser lens
6 Illumination beam path
7 Central bore in 3
8 Second light source
9 Object plane
10 First diffusion disk
11 Second diffusion disk
12 Housing
13 Control system
14 Battery
15 Electrical wiring
16 Control knobs
17 Illumination beams from 2
18 Illumination beams from 8
19 Power supply terminal
20 Optical axis

What is claimed is:

1. An illumination system for a microscope in which the illumination light of a light source (2) impinges upon the object plane (9) through a collector lens (3), an aperture diaphragm (4), and a condenser lens (5), wherein a second light source (8) that is imaged at infinity in the object direction by the condenser lens (5) is arranged on the optical axis of the illumination beam path (6).

2. The illumination system as defined in claim 1, wherein the collector lens (3) has a central bore (7) and the second light source (8) is arranged in said bore (7).

3. The illumination system as defined in claim 1, wherein a diffusion disk (10) is arranged in the illumination beam path (6) between the collector lens (3) and the condenser lens (5).

4. The illumination system as defined in claim 1, wherein at least one surface of the collector lens (3) is of diffusing configuration.

5. The illumination system as defined in claim 3, wherein a second diffusion disk (11) is arranged in the illumination beam path between the first light source (2) and the collector lens (3).

6. The illumination system as defined in claim 1, wherein a lightemitting diode is used as the first light source (2) and/or second light source (8).

7. The illumination system as defined in claim 1, wherein a halogen lamp or incandescent lamp is used as the first light source (2), and a light-emitting diode (8) as the second light source (8).

8. The illumination system as defined in claim 6, wherein the light-emitting diode is configured as a red/green/blue light-emitting diode or white-light light-emitting diode.

9. The illumination system as defined in claim 1, wherein the light sources (2, 8) are arranged together with the collector lens (3) in a separate housing (12); and said housing (12) is configured as a retrofittable module that can be coupled to the condenser lens (5) of the microscope.

10. The illumination system as defined in claim 1, wherein an electrical control system (13) is provided for regulating the brightness and/or color temperature of the light sources (2, 8).

11. The illumination system as defined in claim 1, wherein a control system (13) is provided for switching the two light sources (2, 8) on or off selectably or together.

12. The illumination system as defined in claim 1, wherein a battery (14) is provided as the voltage source for the two light sources (2, 8).

13. The illumination system as defined in claim 9, wherein the individual colors of the red/green/blue light-emitting diode are separately controllable by way of the control system (13).

14. The illumination system as defined in claim 13, wherein the individual colors of the red/green/blue light-emitting diode can be controlled sequentially by the control system (13) to generate a red/green/blue video signal.

15. The illumination system as defined in claim 11, wherein the light-emitting diodes can be controlled in pulsed mode by the control system (13).

* * * * *